United States Patent [19]

Xiao et al.

[11] Patent Number: 5,395,606
[45] Date of Patent: Mar. 7, 1995

[54] METAL NITRIDE POWDERS

[75] Inventors: Youming Xiao; Benj J. Tan; Steven L. Suib, all of Storrs; Francis S. Galasso, Manchester, all of Conn.

[73] Assignee: United Technologies Corporation, Hartford, Conn.

[21] Appl. No.: 147,354

[22] Filed: Nov. 3, 1993

Related U.S. Application Data

[62] Division of Ser. No. 991,885, Dec. 17, 1992, Pat. No. 5,279,808.

[51] Int. Cl.$^6$ .................. C01B 21/072; C01B 21/076
[52] U.S. Cl. ............................ 423/411; 423/409; 423/412
[58] Field of Search ................... 423/409, 411, 412

[56] References Cited

U.S. PATENT DOCUMENTS

| | | | |
|---|---|---|---|
| 4,929,433 | 5/1990 | Hexemer et al. | 423/412 |
| 4,975,260 | 12/1990 | Imai et al. | 423/412 |
| 5,219,804 | 6/1993 | Weimer et al. | 423/412 |
| 5,246,683 | 9/1993 | Parent et al. | 423/412 |
| 5,279,808 | 1/1994 | Xiao et al. | 423/411 |

OTHER PUBLICATIONS

Tan, B. J.; Xiao, Y.; Suib, S. L.; Galasso, F. S.; "Thermodynamic Analysis of the Thermal Nitridation of Aluminum Oxide by Ammonia and Methane", Chemistry of Materials 4 (1992), 648–657.

Kamiya K.; Yoko, T.; Bessho, M.; "Nitridation of TiO$_2$ Fibres Prepared by the Sol-Gel Method", Journal of Materials Science 22 (1987) 937–940.

Kamiya, K.; Nishijima, T.; "Nitridation of the Sol-Gel Derived Titanium Oxide Films by Heating in Ammonia Ga", Journal of American Ceramic Society 73 [9 , 1990, 2750–2752.

Shuskus, A. J.; Reeder, T. M.; Paradis, E. L.; "Rf–Sputtered Aluminum Nitride Films on Sapphire", Applied Physics Letters, vol. 24, No. 4, 15 Feb. 1974, 155–156.

Yoshida, S.; Misawa, S.; Fujii, Y.; Takada, S.; Hayakawa, H.; Gonda, S.; Itoh, A.; "Reactive Molecular Beam Epitaxy of Aluminum Nitride", Journal of Vac. Sci. Technol., 16(4), Jul./Aug. 1979, 990–993.

Bensalem, R.; Abid, A.; Sealy, B. J.; "Evaporated Aluminium Nitride Encapsulating Films", Thin Solid Films, 143 (1986) 141–153.

Lee, B. I.; "Einarsrud, M. A.; Low-Temperature Synthesis of Aluminum Nitride Via Liquid-Liquid Mix Carbothermal Reduction", Journal of Materials Science Letters 9 (1990) 1389–1391.

Kuramoto, N.; Taniguchi, H.; "Transparent AlN Ceramics", Journal of Materials Science Letters 3 (1984) 471–474.

Mitomo, M.; Yoshioka Y.; "Preparation of Si$_2$N$_4$ and AlN Powders From Alkoxide-Derived Oxides by Carbothermal Reduction and Nitridation", Advanced Ceramic Materials, 2 [3A] 253–256 (1987).

Silverman, L. D.; "Carbothermal Synthesis of Aluminum Nitride", Advanced Ceramic Materials, 3 [4] 418–419 (1988).

Teusel, I.; Russel, C. J.; "Aluminium Nitride Coatings on Silicon Carbide Fibres, Prepared by Pyrolysis of a Polymeric Precursor", Journal of Materials Science 25 (1990) 3531–3534.

Arnold, H.; Biste, L.; Bolze, D.; Eichhorn, G.; "Chemical and Plasmachemical Vapour Deposition of Aluminum Nitride Layer", Kristall and Technik, 1976, 11, 17–21.

(List continued on next page.)

*Primary Examiner*—Wayne Langel
*Attorney, Agent, or Firm*—George J. Romanik

[57] ABSTRACT

A metal nitride powder can be made by heating a reactant powder that includes an oxide or hydroxide of Al, Ti, or Zr to a reaction temperature in a nonreactive atmosphere. The heated reactant powder is contacted with a gaseous reactant mixture comprising a nitrogen source and a carbon source. The molar ratio of nitrogen to carbon in the gaseous reactant mixture is at least about 15. The reactant powder is maintained at the reaction temperature for a sufficient time to convert a portion of it to metal nitride powder.

3 Claims, 4 Drawing Sheets

OTHER PUBLICATIONS

Roman, Y. G.; Adriansen, A. P. M.; "Aluminium Nitride Films Made By Low Pressure Chemical Vapour Deposition: Preparation and Properties", Thin Solid Films, 169 (1989) 241–248.

Manaseveit, H. M.; Erdmann, F. M.; Simpson, W. I.; "The Use of Metalorganics in the Preparation of Semiconductor Materials—IV. The Nitrides of Aluminum and Gallium", Journal of Electrochemical Society, 1971, 118, 1864–1868.

Ban, V. S.; "Mass Spectrometric Studies of Vapor--Phase Crystal Growth", Journal of Electrochemical Society, 1972, 119, 761.

Morita, M.: Uesugi, N.; Isogai, S.; Tsubouchi, K.; Mikoshiba, N.; "Epitaxial Growth of Aluminum Nitride on Sapphire Using Metalorganic Chemical Vapor Deposition", Japanese Journal of Applied Physics, vol. 20, No. 1, Jan. 1981, 17–23.

Mizuta, M.; Fujieda, S.; Matsumoto, Y.; Kawamura, T.; "Low Temperature Growth of GaN and AlN on GaAs Utilizing Metalorganics and Hydrazine", Japanese Journal of Applied Physics, vol. 25, No. 12, Dec. 1986, L945–L948.

Gaskill, D. I.; Bottka, N.; Lin, M. C.; "OMVPE Of GaN and AlN Films by Metal Alkyls and Hydrazine", Journal of Crystal Growth 77 (1986) 418–423.

Furukawa, Y.; "Chemical Vapor Deposition of Insulating Films Using Nitrogen Trifluoride", Japanese Journal of Applied Physics, vol. 23 (1984), No. 3, 376–377.

Edgar, J. H.; Yu, Z. J.; Ahmed, A. U.; Rys, A.; "Low Temperature Metal-Organic Chemical Vapor Deposition of Aluminum Nitride With Nitrogen Trifluoride as the Nitrogen Source", Thin Solid Films, 189 (1990) L11–L14.

Chu, T. L.; Ing, D. W.; Noreika, A. J.; "Epitaxial Growth of Aluminum Nitride", Solid–State Electronics, Pergamon Press 1967, vol. 10, 1023–1027.

Callaghan, M. P.; Patterson, E.; Richards, B. P.; Wallace, C. A.; "The Growth, Crystallographic and Electrical Assessment of Epitaxial Layers of Aluminum Nitrode On Corundum Substrates", Journal of Crystal Growth 22 (1974) 85–98.

Pizzarello, F. A.; Coker, J. E.; "The Structural and Piezoelectric Properties of Epitaxial AlN on $Al_2O_3$", Journal of Electronic Materials, vol. 4, No. 1, 1975, 25–36.

Liu, J. K.; Lakin, K. M.; Wang, K. L.; "Growth Morphology and Surface–Acoustics–Wave Measurements of AlN Films on Sapphire", Journal of Applied Physics, vol. 46, No. 9, Sep. 1975, 3703–3706.

Interrante, L. V.; Czekaj, C. L. . . . ; Hackney, M. L. J.; Sigel, G. A.; Schields, P. J.; Slack, G. A.; "An Investigation Into The Preparation, Properties, and Processing of SiC/AlN and $Si_3N_4$/AlN Solid Solutions From Organometallic Precursors", Material Research Society Symp. Proc. vol. 121, 465–4770; no date.

Meikle, S.; Nomura, H.; Nakanishi, Y.; Hatanaka, Y.; "Reactions of Atomic Nitrogen and Trimethyl Aluminum Downstream From a Nitrogen Microwave Plasma", Journal of Applied Physics, 67 (1), Jan. 1990, 483–486.

Shen, T. Y.; Yu, Z. Q.; Collins, G. J.; "Disk Hydrogen Plasma Assisted Chemical Vapor Deposition of Aluminum Nitride", Applied Physics Letter 52 (7), Feb. 15, 1988, 576–578.

Hasegawa, F.; Takahashi, T.; Kubo, K.; Nannichi, Y.; "Plasma CVD of Amorphous AlN from Metalorganic Al Source and Properties of the Deposited Films", Japanese Journal of Applied Physics, vol. 26, No. 9, Sep. 1987, 1555–1560.

METAL NITRIDE POWDERS

Cross-Reference to Related Applications

This application is a division of application Ser. No. 07/991,885, filed Dec. 17, 1992, now U.S. Pat. No. 5,279,808, which is related to commonly-owned U.S. application Ser. No. 07/991,929, filed on Dec. 17, 1992, entitled "Metal Nitride Coated Substrates."

TECHNICAL FIELD

The present invention is directed to a method for making metal nitride powder.

BACKGROUND ART

In recent years, there has been increasing interest in non-oxide ceramics, such as metal nitrides and carbides, that possess high temperature strength and corrosion resistance. Among these materials, aluminum nitride (AlN) is especially important because of its unique physical properties. For example, AlN has a thermal conductivity close to that of metals and more than 10 times that of alumina ($Al_2O_3$), a coefficient of thermal expansion comparable to silicon and silicon carbide, a high electrical resistivity, and mechanical strength comparable to alumina ceramics.

Metal nitride powders can be made in various ways. For example, a metal oxide powder, such as $Al_2O_3$, zirconia ($ZrO_2$), or titania ($TiO_2$), can be mixed with an excess of a carbonaceous powder and heated to a temperature above 1100° C. in a nitrogen-containing atmosphere. The metal nitride powder formed by this method is, however, mixed with unreacted carbonaceous powder that detracts from the properties of the metal nitride powder. The unreacted carbonaceous powder can be removed by oxidizing it at temperatures between about 600° C. and about 700° C. At these temperatures, however, a portion of the metal nitride powder also can oxidize.

U.S. Pat. 4,975,260 to Imai et al. teaches an alternate method for making a metal nitride powder by reacting a metal oxide or metal hydroxide powder with a gaseous mixture of ammonia ($NH_3$) and a hydrocarbon at a temperature ranging from 1300° C. to 1600° C. Although this method is an improvement over some prior art methods, it still leaves residual carbon in the metal nitride product. Moreover, it requires a temperature of at least 1300° C. As with any synthesis process, it is desirable to keep energy consumption as low as possible.

Therefore, what is needed in the industry is a method of making metal nitride powder at a relatively low temperature.

DISCLOSURE OF THE INVENTION

The present invention is directed to a method of making metal nitride powder at a relatively low temperature.

One aspect of the invention includes a method of making a metal nitride powder. A reactant powder comprising an oxide of Al, Ti, or Zr or a hydroxide of Al, Ti, or Zr is heated to a reaction temperature in a nonreactive atmosphere. The heated reactant powder is contacted with a gaseous reactant mixture comprising a nitrogen source and a carbon source. The molar ratio of nitrogen to carbon in the gaseous reactant mixture is at least about 15. The reactant powder is maintained at the reaction temperature for a sufficient time to convert a portion of it to metal nitride powder.

Another aspect of the invention includes AlN, TiN, or ZrN powders made by the method described above.

These and other features and advantages of the present invention will become more apparent from the following description and accompanying drawing.

BEST MODE FOR CARRYING OUT THE INVENTION

Figure 1:
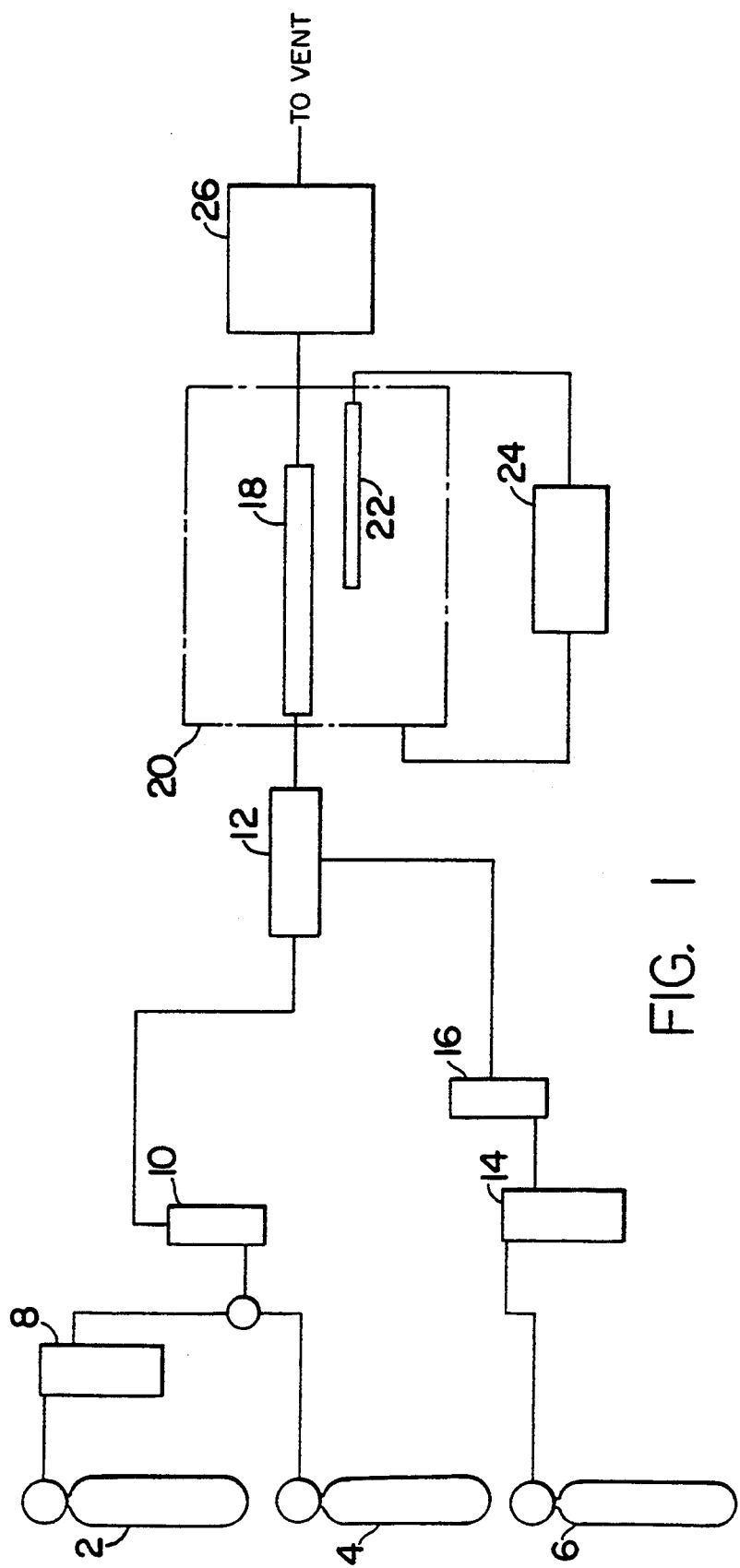
FIG. 1 is a schematic of an apparatus used to make the powder of the present invention.
Figure 2:
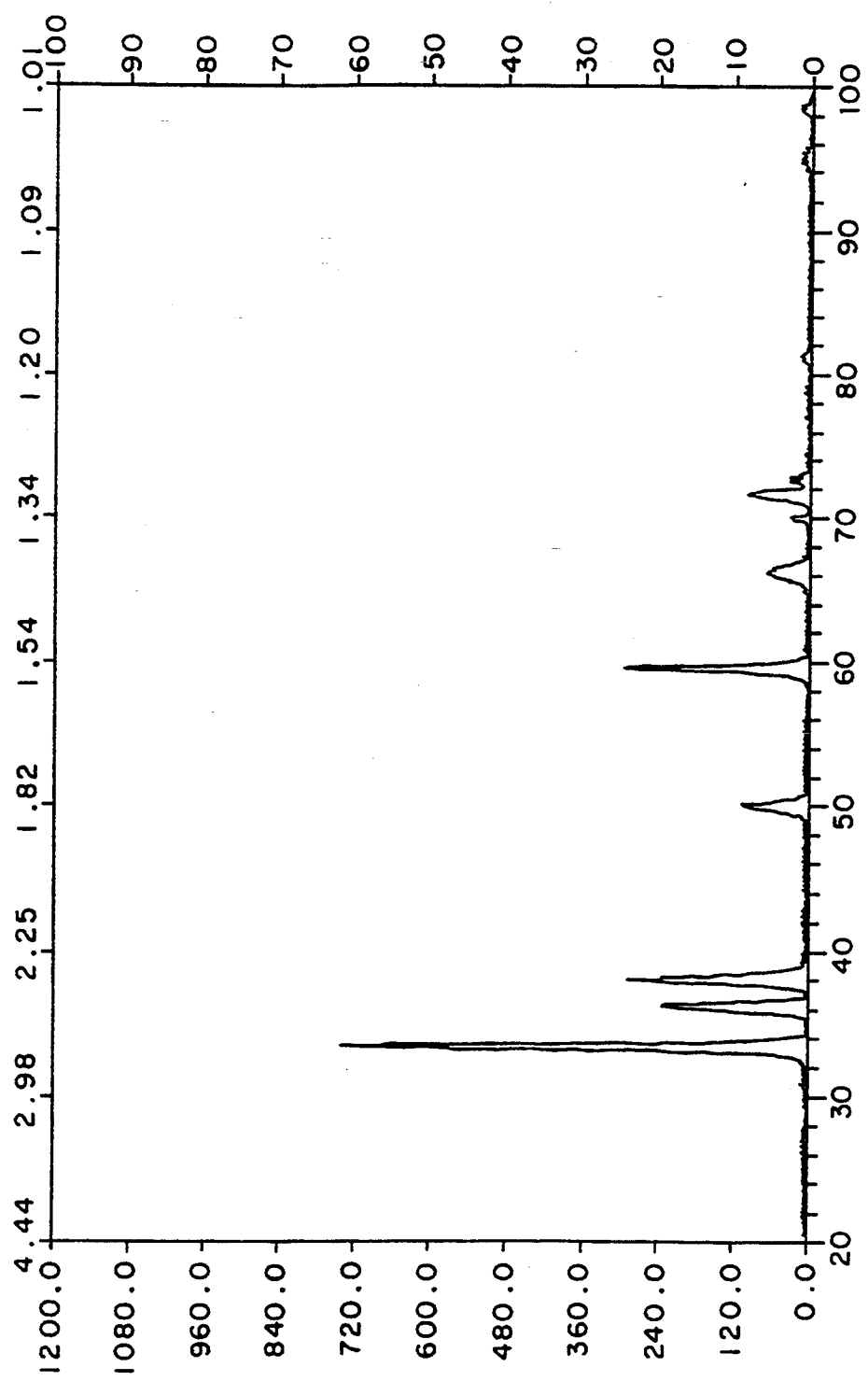
FIG. 2 is an x-ray diffraction pattern for an AlN powder of the present invention formed by reacting reactants at 1050° C. for 3 hr.
Figure 3:
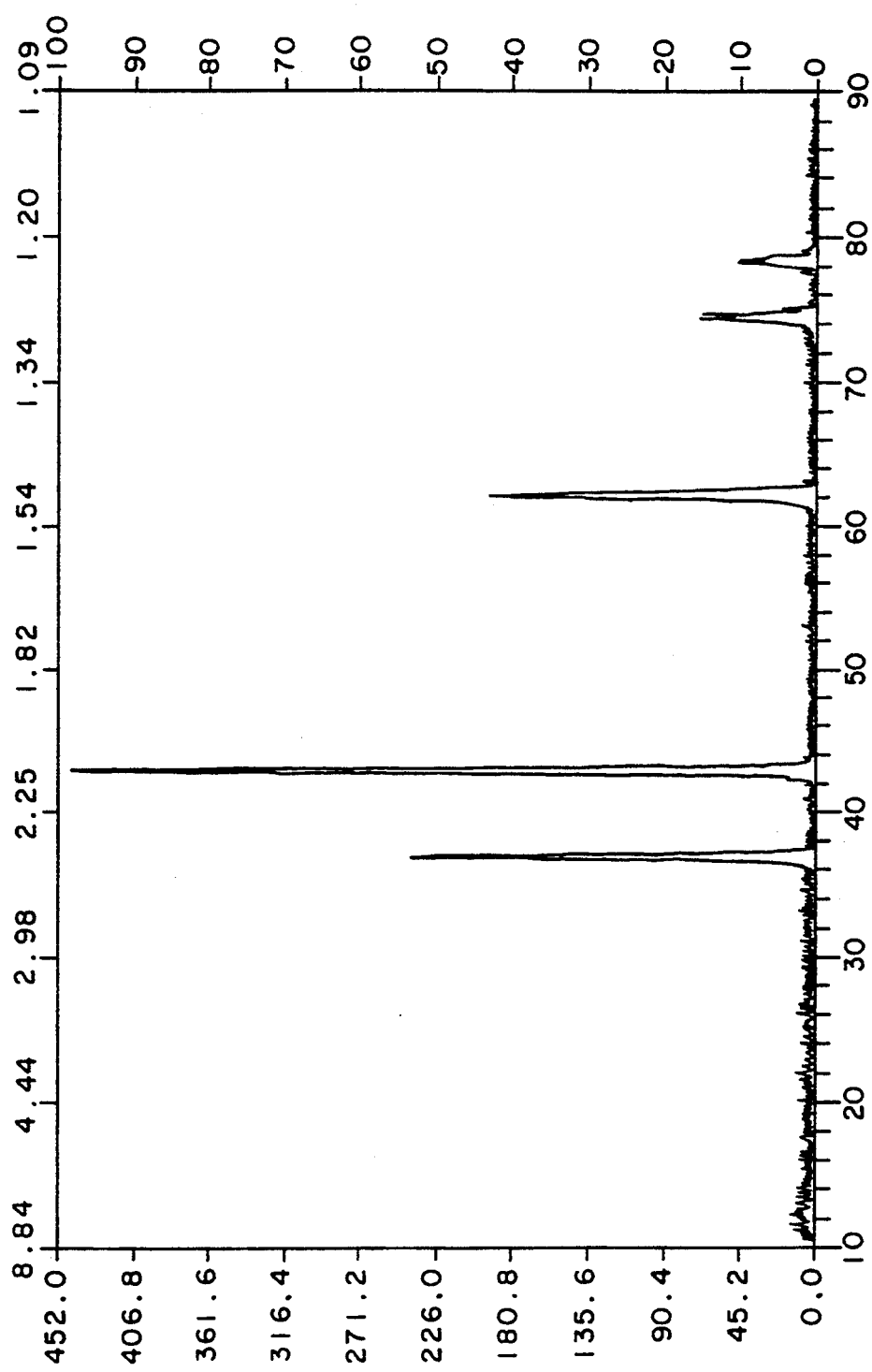
FIG. 3 is an x-ray diffraction pattern for a TiN powder of the present invention formed by reacting reactants at 950° C. for 3 hr.
Figure 4:
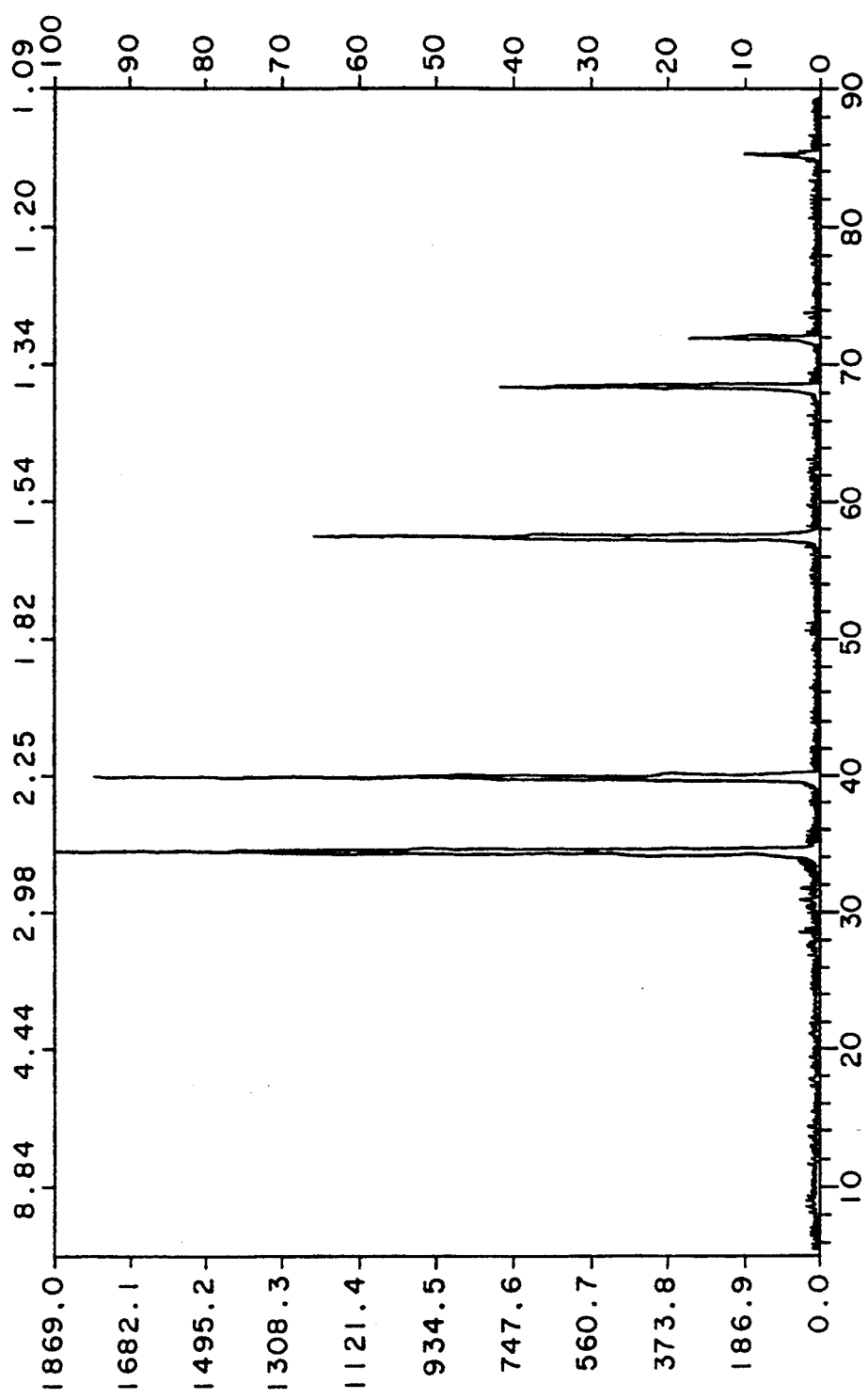
FIG. 4 is an x-ray diffraction pattern for a ZrN powder of the present invention formed by reacting reactants at 1100° C. for 9 hr.

The method of the present invention can make AlN, TiN, ZrN, or YN powders at relatively low temperatures. The starting materials for the nitride powders include oxide or hydroxide powders of Al, Ti, Zr, or Y, such as $Al_2O_3$, $TiO_2$, $ZrO_2$, $Y_2O_3$, $Al(OH)_3$, $Ti(OH)_4$, $Zr(OH)_4$, or $Y(OH)_3$. The remainder of the application describes the method of the present invention in terms of making AlN powder from $Al_2O_3$ powder. One skilled in the art, however, will understand that the following description, with appropriate adjustments to reaction temperature, applies equally to methods of making AlN, TiN, ZrN, and YN from Al, Ti, Zr, and Y oxides or hydroxides.

To make AlN powder by the method of the present invention, $Al_2O_3$ powder is contacted with a gaseous reactant mixture at suitable reaction conditions. The gaseous reactant mixture comprises a nitrogen source and a carbon source. If $NH_3$ is the nitrogen source and $CH_4$ is the carbon source, the reaction can be written as:

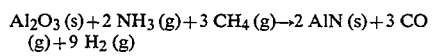

$$Al_2O_3\,(s) + 2\,NH_3\,(g) + 3\,CH_4\,(g) \rightarrow 2\,AlN\,(s) + 3\,CO\,(g) + 9\,H_2\,(g)$$

The $Al_2O_3$ powder may be any high surface area $Al_2O_3$ powder, such as $\gamma$-$Al_2O_3$ or $Al_2O_3$ made with a sol gel method. Suitable $\gamma$-$Al_2O_3$ may be purchased from commercial sources, including Alfa Products (Danvers, Mass.). The size of the $Al_2O_3$ powder used with the present invention is not critical. Preferably, the powder will be of suitable size to permit it to react completely with the gaseous reactant mixture to form AlN powder.

Sol gel $Al_2O_3$ may be made as described in commonly-owned U.S. application Ser. No. 07/991,929, herein incorporated in it's entirety by reference. Aluminum isopropoxide [$Al(O\text{-}i\text{-}C_3H_7)_3$] may be dispersed in water, for example water heated to about 75° C., in any suitable molar ratio of $Al(O\text{-}i\text{-}C_3H_7)_3$ to water to make a sol. For example, the molar ratio may range from about 1:100 to about 1:1000. Suitable $Al(O\text{-}i\text{-}C_3H_7)_3$ may be purchased from commercial sources, including Alfa Products. A small amount of $HNO_3$ or other acid may be added to the sol to bring its initial pH to about 3 to initiate reaction. The acidified sol may be allowed to sit until it is sufficiently viscous, for example about 12 hr, to make a gel. The gel may be formed into a powder by any conventional method such as heating, freeze drying, vacuum drying, or spray drying. After forming the powder, the powder may be allowed to dry for a sufficient time to partially convert it to $Al_2O_3$ and to allow it to be handled more easily. The powder may then be fired for a sufficient time to convert it to $Al_2O_3$. For example, the powder may be fired at about 500° C. for about 30 min in a He atmosphere. The powder also may be fired in air.

The nitrogen source may be any reactive nitrogen compound that is a gas at the reaction conditions. For example, the nitrogen source may be $NH_3$, $N_2H_2$, or $N_2$. Anhydrous $NH_3$ is the preferred nitrogen source because it is readily available and easy to work with. $NH_3$ may be purchased from many suppliers, including Aero All Gas Company (Hartford, Conn.) Preferably, the nitrogen souce will not contain any contaminants that would produce side reactions or otherwise interfere with the nitridation reaction.

The carbon source should be a carbon-containing compound that is a gas at the reaction conditions. For example, the carbon source may be a hydrocarbon or an amine. Although any hydrocarbon that is gaseous at reaction conditions may be used, alkanes having four or fewer carbon atoms are preferred because they are easier to handle. Similarly, amines having four or fewer carbon atoms, such as methyl amine ($CH_3NH_2$), are preferred. Most preferably, the carbon source will be $CH_4$ because it is easy to obtain and use. $CH_4$ may be purchased from many suppliers, including Aero All Gas Co. Preferably, the carbon source will not contain any contaminants that would produce side reactions or otherwise interfere with the nitridation reaction.

The nitrogen and carbon sources in the gaseous reactant mixture may be supplied from separate sources or from a premixed source. In either case, it is preferable that they be mixed upstream of the reactor. The ratios of $N:Al_2O_3$ and $C:Al_2O_3$ in the reactor are not critical, although adequate amounts of gaseous reactants should be used to achieve a desired conversion in a desired time. The ratio of nitrogen to carbon (N:C) in the gaseous reactant mixture is critical to obtaining a substantially carbon-free product. To form such a product, the molar ratio of N:C in the gaseous reactant mixture should be at least about 13. Preferably, the N:C ratio will be between about 15 and about 2,000. Most preferably, the N:C ratio will be between about 30 and about 40.

If desired, $H_2$ may be added to the gaseous reactant mixture to expand the range of conditions under which substantially carbon-free AlN powder can be made. Any excess of $H_2$ will facilitate the conversion of the oxide or hydroxide to the nitride. $H_2$ may be obtained from many commercial suppliers.

The reaction conditions may be any conditions suitable for converting the $Al_2O_3$ powder to AlN. In general, the desired reaction to AlN will occur at temperatures of at least about 850° C. Complete conversion to AlN can be obtained at temperatures greater than about 1000° C. The reaction temperature, therefore, may range from about 850° C. to about 1275° C. or 1299° C. Preferably, the reaction temperature will be about 1000° C. to about 1275° C. and, most preferable, about 1000° C. to about 1100° C. The reaction pressure is not critical and may be any conveniently obtainable pressure.

To make TiN, $TiO_2$ powder can be reacted with a gaseous reactant mixture at temperatures of at least about 750° C. Complete conversion to TiN can be obtained at temperatures greater than about 800° C. $ZrO_2$ powder can be reacted with a gaseous reactant mixture at temperatures of at least about 1050° C. to make ZrN. Complete conversion to ZrN can be obtained at temperatures greater than about 1100° C.

FIG. 1 is a schematic of an apparatus used to make the powder of the present invention. The apparatus has a carbon source cylinder 2, nitrogen source cylinder 4, and inert gas cylinder 6. The reaction takes place in a reactor 18, such as a quartz tube reactor. A suitable amount of $Al_2O_3$ powder is placed into the reactor 18, which is positioned inside furnace 20. The $Al_2O_3$ powder in the reactor 18 is heated to the reaction temperature at a moderate rate, for example, about 11.5° C./min. The actual rate of heating is not critical. The temperature in the reactor 18 can be controlled with a thermocouple 22 and a temperature controller 24. Preferably, the $Al_2O_3$ powder will be preheated in a nonreactive atmosphere so no reactions occur until it reaches the reaction temperature. For example, the powder may be preheated in $NH_3$, $N_2$, $H_2$, or an inert gas such as He, Ne, Ar, Kr, or Xe. The inert gas can be stored in the inert gas cylinder 6 and flowed into the reactor 18 through a molecular sieve 14, flow meter 16, and gas mixing chamber 12. Once the $Al_2O_3$ is at the reaction temperature, the gaseous reactant mixture is flowed into the reactor 18 at a rate sufficient to achieve the desired N:C ratio. The gaseous reactants can be stored in the carbon source cylinder 2 and nitrogen source cylinder 4. They can be flowed into the reactor 18 through a molecular sieve 8, flow meter 10, and gas mixing chamber 12. Effluent from the reactor 18 flows through exhaust gas scrubbers 26 before being vented. Reaction conditions are maintained for a sufficient time to convert a desired amount of the $Al_2O_3$ powder to AlN powder. Preferably, the time will be sufficient to obtain 100% conversion. For example, reaction conditions may be maintained for 1 hr to 2 hr or for up to more than 9 hours. Longer times may be necessary with lower temperatures. After the desired conversion is obtained, the gaseous reactant mixture is shut off and a nonreactive atmosphere is established in the reactor. The reactor and product are then cooled at a convenient rate.

The following examples demonstrate the present invention without limiting the invention's broad scope.

EXAMPLE 1

AlN

About 0.04 g of $\gamma$-$Al_2O_3$ powder (Alfa Products, Danvers, Mass.) was weighed and placed in a quartz boat. The powder had an average particle size between about 1 $\mu$m and about 20 $\mu$m. The quartz boat containing $Al_2O_3$ powder was placed in a 2.5 cm diameter quartz reactor. The powder was heated in flowing $NH_3$ to a reaction temperature of 1050° C. at a rate of 11.5° C./min. The $NH_3$ was flowing at 400 mL/min. Once the reaction temperature was reached, $CH_4$ was flowed into the reactor at 30 mL/min. This provided a N:C ratio in the gaseous reactant mixture of 13.33. Reaction conditions were maintained for 9 hr after which the flow of $CH_4$ was stopped and the powder was cooled. X-ray diffraction showed the powder was completely converted to AlN. X-ray photoelectron spectroscopy showed the powder was substantially carbon-free.

EXAMPLE 2

AlN

Example 1 was repeated with a NH$_3$ flow rate of 400 mL/min and a CH$_4$ flow rate of 18 mL/min to provide a N:C ratio of 22.22. X-ray analysis showed complete conversion to AlN.

EXAMPLE 3

AlN

Example 1 was repeated with a NH$_3$ flow rate of 387 mL/min and a CH$_4$ flow rate of 11 mL/min to provide a N:C ratio of 35.19. Reaction conditions were maintained for 1 hr. X-ray analysis showed that some AlN was formed.

EXAMPLE 4

AlN

Example 1 was repeated with a NH$_3$ flow rate of 395 mL/min and a CH$_4$ flow rate of 13 mL/min to provide a N:C ratio of 29.15. Reaction conditions were maintained for 3 hr. X-ray analysis showed complete conversion to AlN.

EXAMPLE 5

AlN

Example 1 was repeated with a NH$_3$ flow rate of 407 mL/min and a CH$_4$ flow rate of 11 mL/min to provide a N:C ratio of 37.00. Reaction conditions were maintained for 6 hr. X-ray analysis showed complete conversion to AlN.

EXAMPLE 6

AlN

Example 1 was repeated with a NH$_3$ flow rate of 394 mL/min and a CH$_4$ flow rate of 11 mL/min to provide a N:C ratio of 35.82. Reaction conditions were maintained for 12 hr. X-ray analysis showed complete conversion to AlN.

EXAMPLE 7

AlN

Example 1 was repeated with a NH$_3$ flow rate of 387 mL/min and a CH$_4$ flow rate of 11 mL/min to provide a N:C ratio of 35.18. Reaction conditions were maintained for 18 hr. X-ray analysis showed complete conversion to AlN.

EXAMPLE 8

AlN

Example 1 was repeated with a reaction temperature of 1000° C., a NH$_3$ flow rate of 402 mL/min, and a CH$_4$ flow rate of 12 mL/min. The N:C ratio was 33.50. X-ray analysis showed partial conversion to AlN.

EXAMPLE 9

AlN

Example 1 was repeated with a reaction temperature of 950° C., a NH$_3$ flow rate of 391 mL/min, and a CH$_4$ flow rate of 12 mL/min. The N:C ratio was 32.58. X-ray analysis showed partial conversion to AlN.

EXAMPLE 10

AlN

Example 1 was repeated with a reaction temperature of 850° C., a NH$_3$ flow rate of 406 mL/min, and a CH$_4$ flow rate of 11 mL/min. The N:C ratio was 36.91. X-ray analysis showed some AlN, but less than in Example 9.

Table 1 summarizes the results from Examples 1–10. I/I is the ratio of x-ray reflection intensities from the (100) plane of AlN to the reflection intensities from the (100) plane of Al$_2$O$_3$. An I/I of 0 indicates no conversion to AlN. An I/I of $\infty$ indicates complete conversion.

TABLE 1

| Example | Temperature °C. | Time hr | N:C Ratio | I/I |
|---|---|---|---|---|
| 1 | 1050 | 9 | 13.33 | $\infty$ |
| 2 | 1050 | 9 | 22.22 | $\infty$ |
| 3 | 1050 | 1 | 35.19 | 0.20 |
| 4 | 1050 | 3 | 29.15 | $\infty$ |
| 5 | 1050 | 6 | 37.00 | $\infty$ |
| 6 | 1050 | 12 | 35.82 | $\infty$ |
| 7 | 1050 | 18 | 35.18 | $\infty$ |
| 9 | 1000 | 9 | 33.50 | 6.25 |
| 9 | 950 | 9 | 32.58 | 0.74 |
| 10 | 850 | 9 | 36.91 | 0.20 |

EXAMPLE 11

TiN

About 0.05 g TiO$_2$ powder made from titanium isopropoxide [Ti(O-i-C$_3$H$_7$)$_2$] by a sol gel process was weighed and placed in a quartz boat as in Example 1. The powder was heated in flowing He to a reaction temperature of 1150° C. at a rate of 11.5° C./min. Once the reaction temperature was reached, NH$_3$ and CH$_4$ were flowed into the reactor. The flow rates of the NH$_3$ and CH$_4$ were 400 mL/min and 11.5 mL/min, respectively. This provided a N:C ratio of 35. Reaction conditions were maintained for 3 hr, after which the flows of NH$_3$ and CH$_4$ were stopped and the powder was cooled in He. X-ray diffraction showed the powder was completely converted to TiN.

EXAMPLES 12–15

TiN

Example 11 was repeated with reaction temperatures of 1050° C., 950° C., 850° C., and 750° C. X-ray diffraction showed complete conversion at 1050° C., 950° C., and 850° C. Partial conversion was observed at 750° C.

Table 2 summarizes the results from Examples 11–15. I/I is the ratio of x-ray reflection intensities from the (101) plane of TiN to the reflection intensities from the (101) plane of TiO$_2$. An I/I of 0 indicates no conversion to TiN. An I/I of $\infty$ indicates complete conversion.

TABLE 2

| Example | Temperature °C. | Time hr | N:C Ratio | I/I |
|---|---|---|---|---|
| 11 | 1150 | 9 | 35 | $\infty$ |
| 12 | 1050 | 9 | 35 | $\infty$ |
| 13 | 950 | 9 | 35 | $\infty$ |
| 14 | 950 | 9 | 35 | $\infty$ |
| 15 | 750 | 9 | 35 | 0.33 |

EXAMPLE 16

ZrN

About 0.03 g of $ZrO_2$ powder made from zirconyl nitrate [$ZrO(OH)NO_3$] was weighed and placed in a quartz boat as in Example 1. The powder was heated in flowing He to a reaction temperature of 1100° C. at a rate of 11.5° C./min. Once the reaction temperature was reached, $NH_3$ and $CH_4$ were flowed into the reactor. The flow rates of the $NH_3$ and $CH_4$ were 400 mL/min and 11 mL/min, respectively. This provided a N:C ratio of 36.7. Reaction conditions were maintained for 9 hr, after which the flows of $NH_3$ and $CH_4$ were stopped and the powder was cooled in He. X-ray diffraction showed the powder was completely converted to ZrN.

The method of the present invention improves over the prior art by allowing substantially carbon-free metal nitride powder to be made at temperatures less than 1300° C. The powder of the present invention can be used for any application known in the art, for example, as a precursor for a thermal spray coating.

The invention is not limited to the particular embodiments shown and described herein. Various changes and modifications may be made without departing from the spirit or scope of the claimed invention.

We claim:

1. AlN powder made by:
   (a) heating a reactant powder comprising an aluminum oxide or an aluminum hydroxide to reaction temperature greater than 1000° C. in a nonreactive atmosphere,
   (b) contacting the heated reactant powder with a gaseous reactant mixture comprising a nitrogen source and a carbon source, wherein the gaseous reactant mixture has a molar ratio of nitrogen to carbon of at least about 15, and
   (c) maintaining the reactant powder at the reaction temperature for a sufficient time to convert the reactant powder completely to AlN powder,
   wherein the AlN powder is substantially carbon-free and oxygen-free.

2. TiN powder made by:
   (a) heating a reactant powder comprising a titanium oxide or a titanium hydroxide to a reaction temperature greater than about 800° C. in a nonreactive atmosphere,
   (b) contacting the heated reactant powder with a gaseous reactant mixture comprising a nitrogen source and a carbon source, wherein the gaseous reactant mixture has a molar ratio of nitrogen to carbon of at least about 15, and
   (c) maintaining the reactant powder at the reaction temperature for a sufficient time to convert the reactant powder completely to TiN powder,
   wherein the TiN powder is substantially carbon-free and oxygen-free.

3. ZrN powder made by;
   (a) heating a reactant powder comprising a zirconium oxide or a zirconium hydroxide to a reaction temperature greater than about 1100° C. in a nonreactive atmosphere,
   (b) contacting the heated reactant powder with a gaseous reactant mixture comprising a nitrogen source and a carbon source, wherein the gaseous reactant mixture has a the molar ratio of nitrogen to carbon of at least about 15, and
   (c) maintaining the reactant powder at the reaction temperature for a sufficient time to convert the reactant powder completely to ZrN powder
   wherein the ZrN powder is substantially carbon-free and oxygen-free.

* * * * *